United States Patent [19]

Breitenbach

[11] 4,310,966
[45] Jan. 19, 1982

[54] METHOD OF MAKING A STATOR FOR LINEAR MOTOR

[75] Inventor: Otto Breitenbach, Nuremberg, Fed. Rep. of Germany

[73] Assignee: Kabel-und Metallwerke Gutehoffnungshutte AG, Hanover, Fed. Rep. of Germany

[21] Appl. No.: 45,952

[22] Filed: Jun. 6, 1979

[30] Foreign Application Priority Data

Jun. 7, 1978 [DE] Fed. Rep. of Germany ....... 2824951

[51] Int. Cl.³ ............................................ H02K 15/085
[52] U.S. Cl. ......................................... 29/596; 29/605
[58] Field of Search .......................... 29/596, 598, 605; 310/12, 13, 27

[56] References Cited

U.S. PATENT DOCUMENTS 3,622,818 11/1971 Payen ..................................... 310/13
3,761,747 9/1973 Allaigre ................................. 310/13
4,182,026 1/1980 Seavele ................................. 29/596

FOREIGN PATENT DOCUMENTS 1175487 12/1969 United Kingdom .................. 310/13

Primary Examiner—Carl E. Hall
Attorney, Agent, or Firm—Smyth, Pavitt, Siegemund & Martella

[57] ABSTRACT

A long stator for a linear motor is assembled from many individual core elements provided with transverse grooves into which one places cable to be retained in the grooves so that they physically interconnect the stator elements and establish a chain-like assembly which can be, e.g., wound on drums and hauled to an installation site where the assembly is affixed to carriers along or on the track on which the movable part of the motor runs.

1 Claim, 4 Drawing Figures

METHOD OF MAKING A STATOR FOR LINEAR MOTOR

BACKGROUND OF THE INVENTION

The present invention relates to linear motors and, more particularly, the invention relates to a stator assembly for such a motor.

Linear motors are well known generally for a considerable length of time; also, linear motors have been constructed in a variety of configurations; there are d-c motors, and synchronous as well as asynchronous a.c. motors. Generally speaking, a linear motor includes a stator arranged in, or along, a line, and does not have an annular configuration. The moving armature is correspondingly constructed; it does not rotate.

The linear motor provides, generally, a conversion of electrical energy into translatory mechanical energy. A three-phase motor, for example, has three separate energizing systems, being suitably arranged in the stator body. The armature may consist of a rail element made of copper or aluminum, i.e., of a good electrical conductor to establish an asynchronous motor. Alternatively, the armature may be comprised of a permanent magnetic body for establishing a synchronous motor. A certain variety of linear motors includes coils on the armature.

Linear motors are used for a variety of purposes, such as "people movers," as drive in the conveyor and transport art, for example, for baggage handling, or for moving freight, generally. Linear motors are also used in mining, for operating cranes, drag equipment, slides in machine tools, operation of gates, etc. The length of such a motor depends greatly on its use and on the path length to be traversed. The stator coils and winding, i.e., its wiring, can be, and usually has been, placed inside the stator core body. Thus, assembling of the coil is a significant part of the stator installation and is very costly for long stators. Particularly, the known stator installations require highly skilled persons.

In a more specific example, consider a linear motor constructed for driving any kind of transportation equipment, such as a vehicle. The stator is to be installed along the track on which the vehicle runs. Such a track is rarely very straight. Rather, the transport path and track may have many curves. Upon installing the stator, many parts are assembled along that track and fastened to a carrier or the like. The individual stator parts are separated from each other by gaps for reasons of tolerances. These gaps may become quite large in curves of the track. Moreover, one will have to provide for larger gaps, the longer the stator parts are, and these parts are quite large in order to reduce on-site installation time. The resulting gaps inevitably interfere with the magnetic flux distribution of the motor. Moreover, if the gaps are irregularly wide (as one must expect), the interference with the flux distribution is correspondingly an irregular one. To compensate at least these irregularities, one has to adjust the position of the stator parts to each other at the installation site which is quite a time-consuming procedure.

DESCRIPTION OF THE INVENTION

It is an object of the present invention to provide a new and improved stator for a linear motor to facilitate greatly the installation of such a stator.

It is another object of the present invention to provide a new and improved method for assembling a stator for a linear motor.

It is a specific object of the present invention to provide a stator for a linear motor to be preassembled independently from the installation site, and to be mounted thereat with little effort.

In accordance with the preferred embodiment of the present invention, it is suggested to provide plural, relatively short stator elements, each having at least one (preferably two) grooves and to line these elements up so that the grooves extend transversely to the line-up. Cables, preferably three different cables for a three-phase system, are now placed into the grooves, are retained therein, and run in meandering patterns to establish an assembly in which the cables hold the individual stator elements together in a linear arrangement. This assembly is of a flexible, chainlike configuration which can be, for example, wound on drums and hauled to the installation site where the individual stator elements are fastened to suitable carriers.

The preferred embodiment of the invention, i.e., the particular stator as well as the particular method of assembly, employment, and use will be explained in greater detail with reference to the accompanying drawing.

DESCRIPTION OF THE DRAWINGS

Proceeding now to the detailed description of the drawings, FIGS. 1 and 2 illustrate a track 1 of the monorail variety and along which a vehicle 2 moves and is to be driven and powered by means of a linear motor. The monorail 3 in this case serves also as carrier for the stator part of the linear motor, the armature being part of the vehicle.

Figure 1:
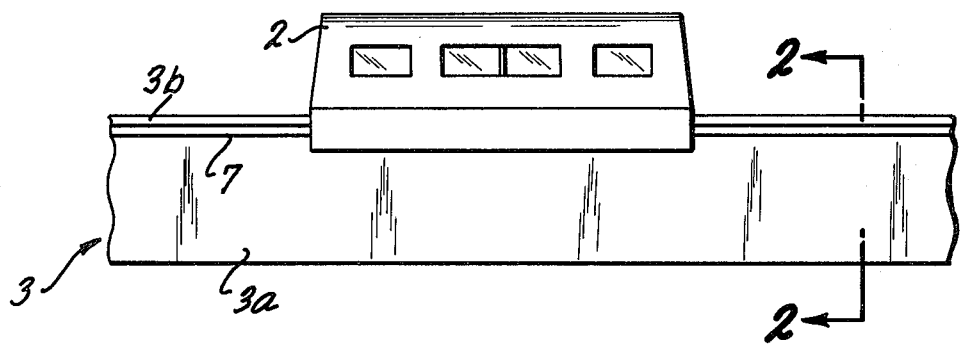
FIG. 1 is a schematic side view of a track equipped with a linear motor for driving a vehicle.
Figure 2:
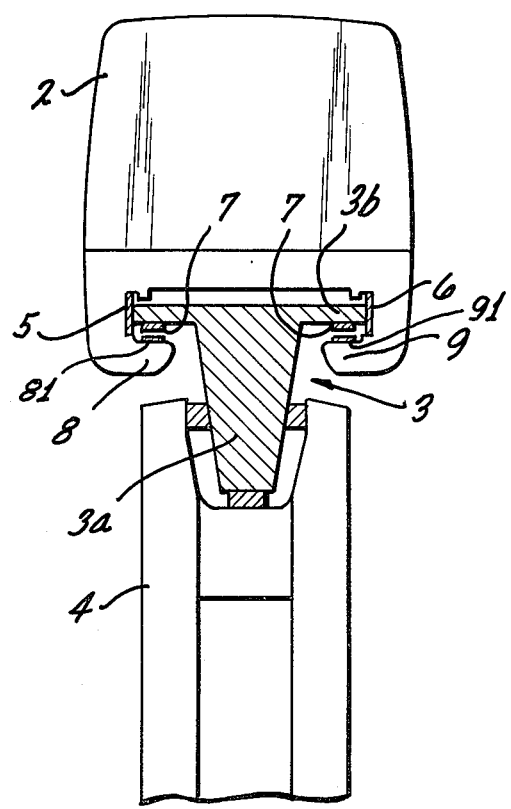
FIG. 2 is a section view taken along line II—II in FIG. 1.

Rail 3 has, in cross section, a stem portion 3a and cross-part or flange 3b for completing a T. Stem part 3a is affixed to posts 4, being spaced at suitable distances along the track. Stator 7 of the linear motor is affixed to cross-part and T flange 3b of the rail. One can see that actually two stators are provided.

Reference numerals 8 and 9 refer to parts of the vehicle which grip around flange or cross-part 3b of the rail, and these parts 8 and 9 carry the armature parts 81 and 91 of the linear motors, facing the downwardly directed stators 7.

Reference numerals 5 and 6 refer to guide elements on the edges of cross-part 3b to guide and to position the vehicle. The vehicle-track interaction, as far as the mechanics are concerned, does not require elaboration. The invention is concerned with the stator and with the assembly and installation of that stator, and it is proposed here to proceed as follows.

The basic building block for the stator is an element 10 assembled from E-shaped sheet stock, the sheets being superimposed in a manner equivalent to stator and transformer assembly, in general. These stator elements 10 are placed on the T-flange 3b of the rail, there being small gaps 10' between adjacent ones of these elements.

Due to the E-shaped contour, two grooves 11 and 11' are established in each stator element 10, which grooves receive the windings for this motor. Since we consider a three-phase system, three separate cables 12, 13, and 14 are provided, and one can see that the two grooves of each stator element receive respectively two of these three cables. FIG. 4 shows the two cables 12 and 13 in the two grooves, the third cable, 14, bypasses this particular element; the bypassing generally can readily be derived from FIG. 3, in which cable 13 bypasses element 10 in the center of the figure.

On the other hand, each stator element is physically connected by the respective two cables to elements in front and behind, which latter two are interconnected by the one cable bypassing the central one considered. The same consideration applies to all elements (except, of course, for the very first and the very last one of a long assembly for which special provisions must be made in conjunction with the feeding of power to all three cables).

Figure 3:
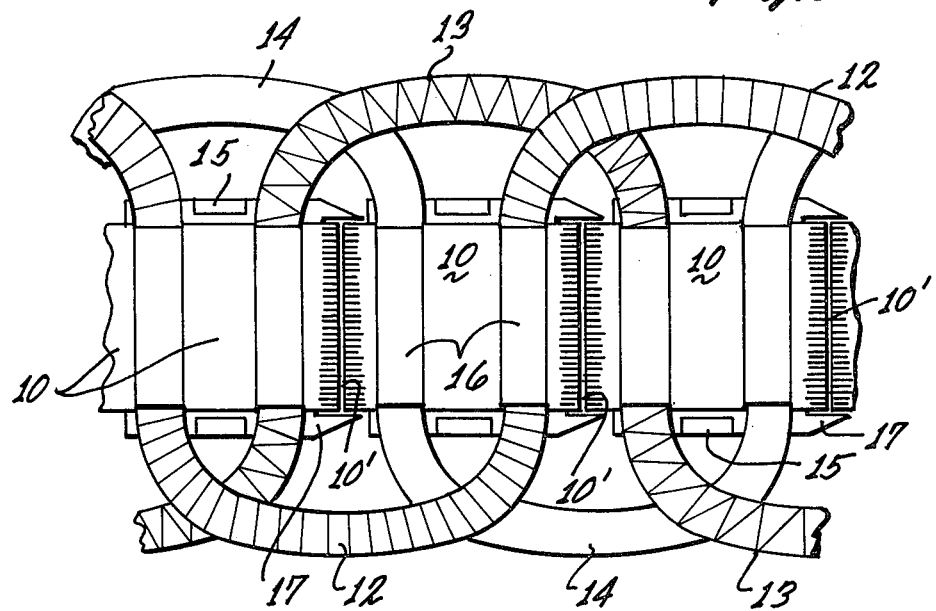
FIG. 3 is an enlarged top elevation of a portion of the novel stator as used in the system of FIG. 1.
Figure 4:
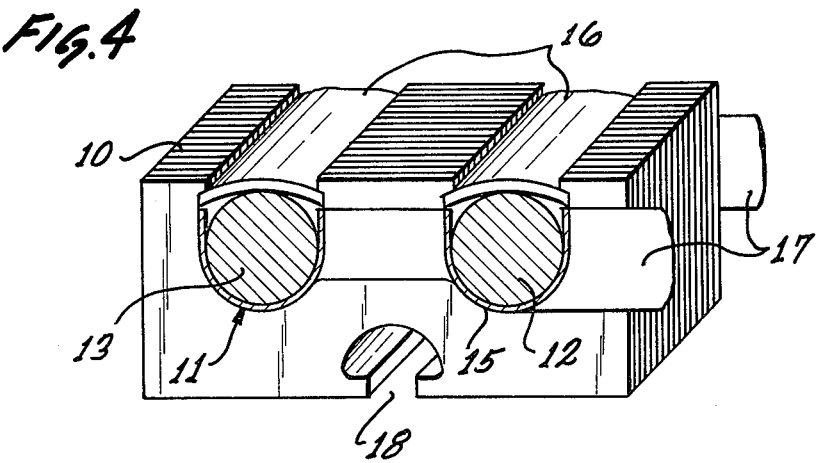
FIG. 4 is a perspective view of one stator element as used in the assembly as per FIG. 3.

FIG. 3 shows these three cables with different surface hatchings to facilitate their identification. In reality, they may be differently colored, or be marked in any convenient manner, to distinguish them visibly. Thus, one can readily see that the assembly is of a chain-like, i.e., flexible, configuration on account of (a) the gaps 10' and (b) the physical interconnection of the elements by the three cables.

The grooves in body or element 10 are preferably lined by means of groove linings 15 in order to protect the cable insulation against any damage from sharp edges of the sheets from which an element is assembled. After placing the cable into the lined grooves, the latter are closed by means of arcuate elements 16 which are preferably snapped into suitable small grooves just above the lining. Thus, the snapped in (and, possibly, additionally bonded) covers 16 fasten and secure the cables in the several grooves to retain the cable therein and to render the assembly stable.

It can, thus, be seen that the multiple elements 10 are, in fact, held together by the placed-in and secured cable. This string or chain-like assembly can, thus, be reeled on a drum and in as great a length as can be conveniently stored on a drum which, in turn, must then be transported to the installation site. This aspect and feature, in turn, permits preassembly of the stator in the factory as a flexible article of manufacture. Such a stator can, thus, be made at any length, limited only by the storage capacity and other transport constraints under which the stator is hauled to the installation site. Such limitations are not posed by the assembly technique for the stator and its construction.

The stator assembly will be unwound at the site and affixed to carrier 3. This procedure is, of course, optional, but very convenient. One may assemble the stator in the stated manner right at the site and bring elements 10 as well as the cable to that site. Obviously, the conditions under which the installation takes place and the particulars of the location may influence the choice in the procedure. Decisive is that the construction principles involved in this stator permits its assembly away from the installation site.

The stator as illustrated shows the following additional features. First of all, the individual elements 10 are provided with an additional groove 18 opposite the cable receiving grooves 11 and 11'. Thus, groove 18 is one part of a fastening means by means of which the element is affixed to the rail carrier or track 3. Flange 3b of carrier 3 is provided with suitable shoes to be slid into grooves 18 of the several elements. This is, indeed, a very simple mounting procedure.

One or both of the groove linings 15 are provided with two vanes 17 which extend in length direction as far as the stator is concerned to facilitate the mutual orientation of the elements 10 to each other. This feature reduces further the amount of adjusting needed at the installation site.

The length of the individual elements 10 is per se arbitrary, but for ease of adjustment to curved tracks, they should be as short as possible. Also, winding such an assembly on a drum is facilitated by short elements. For practical reasons, an element should have at least two grooves to receive two different ones of the three cables. A third groove could be provided for the third cable, but that is not necessary. Using short elements does not increase the amount of work and effort to mount the stator nor does it complicate the assembly; quite to the contrary, shorter elements are easier to handle for placing the cable into the several grooves. Of course, short elements will more readily accommodate to sharp curves. Moreover, the shorter the elements, the smaller is the angle between facing end faces of two adjacent elements (establishing gaps 10'), so that the flux path across that gap is disturbed to a lesser extend and the overall "gap" in the assembly is better distributed along the track.

The invention is not limited to the embodiments described above, but all changes and modifications thereof not constituting departures from the spirit and scope of the invention are intended to be included.

I claim:

1. Method of making and completing a stator for a linear motor, comprising the steps of
   providing a plurality of core elements, each having at least one transverse groove, and arranging these elements in a line transversely to the grooves;
   placing a plurality of different, individual cables separately into the grooves in a meandering pattern as to each cable, whereby adjacent ones of the grooves receive a different one of the cables;
   retaining the cable in the grooves to provide an elongated assembly comprised of the plural elements held together by the cables;
   winding the assembly on a drum and transporting it to the carrier; and
   subsequently affixing the elements as so assembled to a carrier.

* * * * *